United States Patent
Keithley et al.

(10) Patent No.: US 6,356,670 B1
(45) Date of Patent: Mar. 12, 2002

(54) CONVERSION OF ERROR-DIFFUSED FACSIMILE IMAGES TO LOWER RESOLUTIONS

(75) Inventors: Douglas G. Keithley, Boise; Brent D. Rasmussen, Meridian, both of ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/255,362

(22) Filed: Feb. 23, 1999

(51) Int. Cl.[7] .................................................. G06K 9/32
(52) U.S. Cl. ........................ 382/300; 358/400; 358/434; 358/465; 358/455; 382/252
(58) Field of Search .................................... 382/300, 317, 382/252, 237; 358/400, 405, 434, 428, 429, 451, 402, 411, 465, 466, 455, 458

(56) References Cited

U.S. PATENT DOCUMENTS

| | | | | |
|---|---|---|---|---|
| 4,622,592 A | * | 11/1986 | Lkehata et al. | 358/257 |
| 4,633,326 A | * | 12/1986 | Endoh et al. | 358/280 |
| 5,172,246 A | * | 12/1992 | Yoshida | 358/406 |
| 5,305,116 A | * | 4/1994 | Kagami | 358/448 |
| 5,828,771 A | * | 10/1998 | Bloomberg | 382/112 |
| 5,896,203 A | * | 4/1999 | Shibata | 358/404 |
| 5,936,742 A | * | 8/1999 | Horiuchi et al. | 358/400 |
| 6,072,600 A | * | 6/2000 | Wertsbarger | 358/479 |
| 6,160,639 A | * | 12/2000 | Lutgen et al. | 358/442 |

\* cited by examiner

*Primary Examiner*—Bhavesh Mehta
*Assistant Examiner*—Yosef Kassa

(57) ABSTRACT

A method of sending a facsimile of a document includes diffusing a grayscale image to produce a binary, black-and-white image having on/off image values corresponding to a first spatial resolution. When communicating with a remote facsimile device that supports a lower resolution, the black-and-white image is converted to a lower resolution. To perform this conversion, a scaled value for each image value of the lower-resolution image is calculated by interpolating between neighboring dots of the original black-and-white image. The resulting scaled values are then error diffused to create a black-and-white image.

15 Claims, 3 Drawing Sheets

CONVERSION OF ERROR-DIFFUSED FACSIMILE IMAGES TO LOWER RESOLUTIONS

TECHNICAL INVENTION

The invention relates to methods of converting diffused black-and-white images to lower spatial resolutions for transmission to remote facsimile devices that support only such lower spatial resolutions.

BACKGROUND OF THE INVENTION

Facsimile machines have become common business and household appliances. One reason for their widespread acceptance is that they use a well-known and firmly established data communications protocol, which is common to all different makes and models of facsimile devices.

Historically, facsimile machines have utilized a spatial resolution of about 200 dots per inch (DPI). This resolution was agreed upon at a time when available data transmission rates were much lower than they are today.

With the availability of higher data transmission rates, more recent facsimile machines have been equipped with the capability of scanning and printing images at higher resolutions such of approximately 300 DPI. Facsimile protocols have been extended to allow such enhanced resolution. Compatibility between facsimile devices supporting different resolutions has been ensured by providing a negotiation procedure within the facsimile communications protocol. As a result of this negotiation procedure, a sending device transmits a facsimile image at the highest resolution that is supported by both the transmitting device and the receiving device.

In many cases, the resolution is negotiated prior to scanning documents. In these cases, documents are subsequently scanned at the negotiated resolution.

Some facsimile machines, however, support a mode in which batch scanning is performed initially, with actual transmission delayed at the user's option. This is useful, for example, when scheduling a facsimile transmission for a later time, to take advantage of cheaper telephone rates.

Such delayed transmission can be problematic in situations where the sending device supports a higher resolution than the receiving devices. In a situation such as this, the sending device will typically scan the document at a high resolution. If it turns out that the receiving device supports only a lower resolution, the previously scanned image is converted to a lower resolution. The problem is that this conversion can seriously degrade the quality of the resulting facsimile image. In fact, the converted image is often worse than if the document had been originally scanned at the lower resolution.

This result is brought about by the use of diffusion methods when originally scanning the document at the high resolution. When scanning, an image is initially recorded as an array of scaled values, representing shades of gray. For example, values might range from 0 to 255, representing shades of gray from white to black. However, facsimile protocols are designed to support only binary or black-and-white images, in which individual dots are represented by binary or "on/off" values corresponding to either black or white. Thus, before sending an image facsimile, its scaled values are converted to on/off values. When storing an image for later transmission, it is desirable to store the on/off values rather than the scaled values in order to conserve memory.

In converting scaled image values to on/off values, many facsimile devices utilize some form of diffusion (such as linear diffusion or error diffusion) in order to represent shades of gray as patterns of dots. Although this sacrifices resolution, it results in a more aesthetically pleasing reproduction of the original image.

Although diffusion produces a more pleasing black-and-white image, it results in scattered dots that create problems when converting to a lower resolution image. A conversion to a lower resolution is usually performed by omitting dots. For example, conversion from 300 DPI to 200 DPI might be performed by omitting every third dot or by equating each dot of the lower-resolution image with its nearest binary neighbor in the original, higher-resolution image. When converting in this manner, the scattered dots created during diffusion can become more closely grouped, leaving noticeable image artifacts.

One way to avoid this problem is to store scanned images as grayscale images, and to delay diffusing the image until a desired transmission resolution has been negotiated. The disadvantage of this approach is that grayscale images require much more memory than binary images.

The invention described below allows images to be stored in binary format, and to be converted to lower resolutions as needed, without significant degradation in image quality other than what would be expected when going to a lower resolution.

SUMMARY OF THE INVENTION

In accordance with the invention, a facsimile device scans a grayscale image and diffuses it to create a binary, black-and-white image having an array of on/off values. To convert the image to a lower resolution, the image is treated as a grayscale image and linear interpolation is performed to determine grayscale values of a lower resolution grayscale image. The lower resolution grayscale image is then diffused to create a lower resolution black-and-white image.

DETAILED DESCRIPTION OF THE INVENTION

Figure 1:
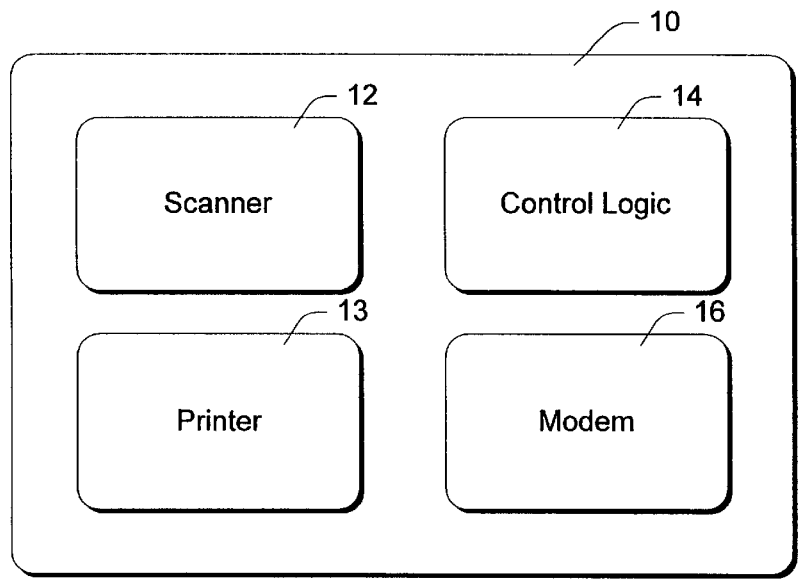
FIG. 1 is a block diagram showing pertinent components of a facsimile device in accordance with a described embodiment of the invention.

FIG. 1 shows pertinent components of a facsimile device 10 in accordance with the invention. It includes an optical scanner 12, a print mechanism 13, and control logic 14, and a data transceiver 16. The optical scanner accepts a paper or other sheet-like document and creates a digital image of the document. In the described embodiment, the digital image is initially recorded as a grayscale image-as a two-dimensional array of grayscale values corresponding to a particular spatial resolution relative to the document. For example, the array might represent a resolution of approximately 300× 300×8. This indicates a spatial resolution of 300×300 DPI and a color depth of 8 bits. With 8 bits of color depth, grayscales ranging from 0 to 255 can be represented.

Print mechanism 13 is configured to print binary images on paper or other sheet-like documents. It has a spatial print resolution equal to the spatial scanning resolution of scanner 12, which in this case is about 300×300 DPI. When printing an image, each dot of the image is either left white or printed black, in accordance with conventional facsimile standards which accommodate black-and-white images rather than grayscale images.

Transceiver 16 is a typical modem for communicating digital data over conventional telephone lines.

Control logic 14 comprises a programmable microprocessor and associated components such as program memory, programmed to implement the functions described below. In some embodiments, the control logic might be implemented in hardware or firmware, or as some combination of a programmable logic components, hardware or hardwired logic components, and/or firmware.

Figure 2:
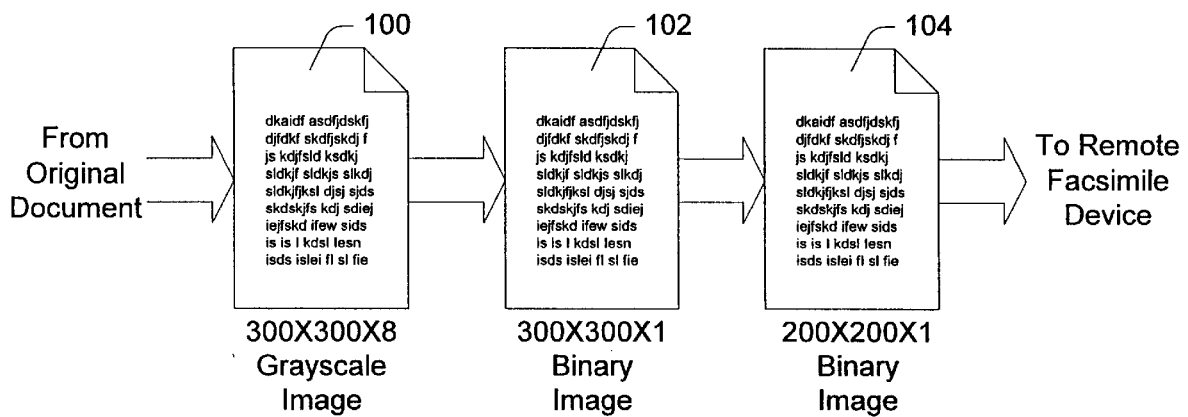
FIG. 2 is a conceptual diagram illustrating conversion steps in accordance with the described embodiment of the invention.

FIG. 2 illustrates conversion steps performed in the described embodiment of the invention for sending an image facsimile to a remote facsimile device that supports only lower resolutions than that supported by facsimile device 10.

A first step in accordance with the invention comprises scanning a document image to produce a digital, grayscale image representation 100 of the document, in which a two-dimensional array of image dots is represented as a corresponding array of grayscale values. In this embodiment, the grayscale values are bytes, having values ranging from 0 to 255. A value of 0 represents white, a value of 255 represents black, and intermediate values represent shades of gray. This scanning step is performed at a relatively high spatial resolution, such as about 300 DPI in the described embodiment. This results in a digital image having a resolution of 300×300×8.

A subsequent step comprises diffusing the grayscale image 100 to produce a binary or black-and-white image 102. This binary image is represented as an array of on/off image values (referred to below as the original array) corresponding to the relatively high spatial resolution of grayscale image 100, but with a color depth of 1:300×300×1. Each on/off image value is thus a single bit in this array. "On" corresponds to a value of 1, and represents a black dot. "Off" corresponds to a value of 0, and represents a white dot. This original on/off image value array is then stored for later transmission. In many situations, a plurality of images are stored concurrently for delayed transmission.

Facsimile device 10 then calls and negotiates with a remote facsimile device to transmit the image at a relatively low spatial resolution, in comparison to the higher spatial resolution of the stored image. For example, the receiving remote device might support a spatial resolution of approximately 200 DPI rather than the 300 DPI at which the image was initially scanned and stored. In response to the need for a lower-resolution black-and-white image, control logic 14 converts black-and-white image 102 to a lower-resolution black-and-white image 104 having a resolution of 200×200× 1. This lower-resolution image is represented by a second array of on/off or binary image values (referred to as the converted array), corresponding to the relatively low spatial resolution of 200 DPI and the binary color depth of 1. This lower-resolution image is transmitted to the remote facsimile device.

In order to convert the original, high-resolution array of on/off values to the converted, lower-resolution array of on/off values, all of the values of both arrays are considered to be scaled values, within the range 0 to 255. The on/off values of the original array are converted to scaled values by equating white values to 0 and black values to 255. These scaled values of the original array are then used to calculate scaled values of the converted array.

Figure 3:
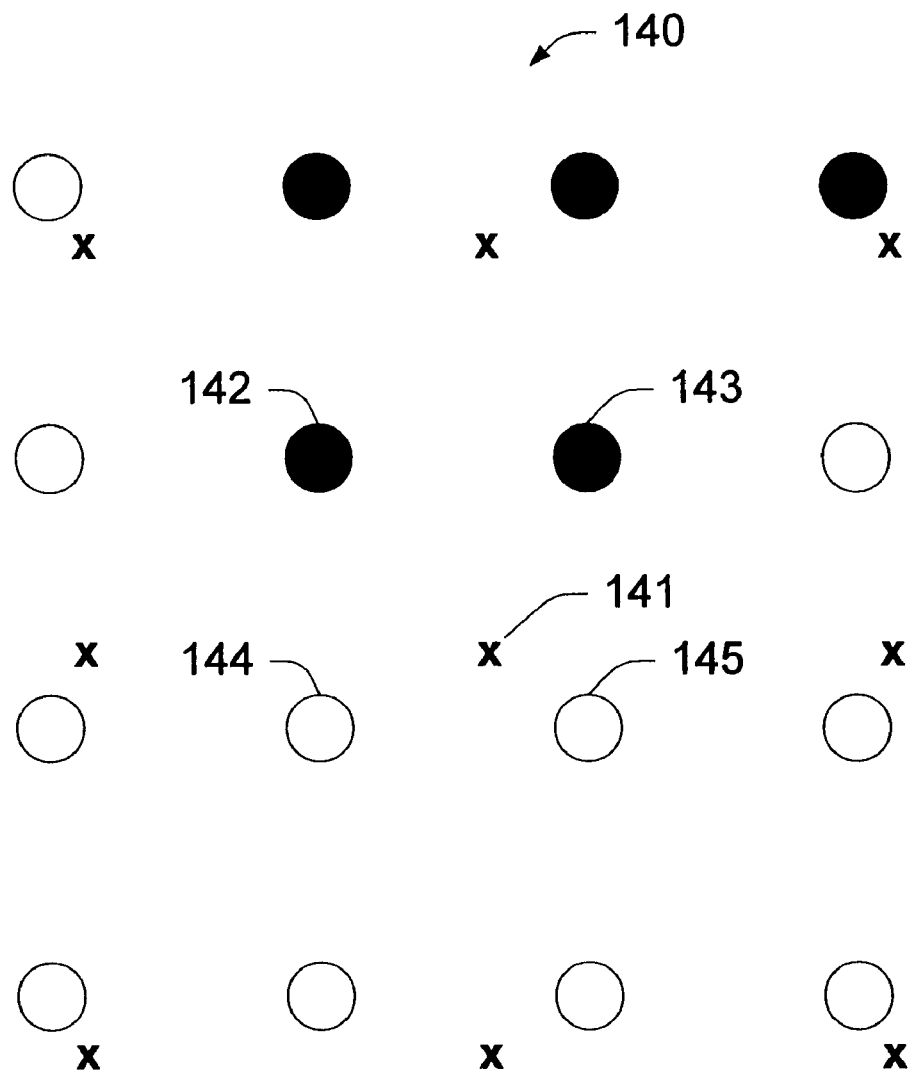
FIG. 3 illustrates the conversion of image dots from a high-resolution image to a lower-resolution image in accordance with the described embodiment of the invention.

FIG. 3 illustrates individual dots corresponding to both the original array and the converted array. Dots corresponding to the original array are shown as either filled or unfilled circles depending on whether they represent black or white dots, respectively. Dots corresponding to the converted array are shown as x's, whose scaled values are yet to be determined.

As an example, suppose that a scaled value of the converted array, corresponding to dot 141, is to be calculated. In accordance with the invention, this involves first identifying its neighboring dots and corresponding neighboring values from the original array. In the described embodiment, such neighboring dots are considered to be the four surrounding dots of the original array, identified by reference numerals 142–145 in FIG. 3. In this example, two of these dots are white and two are black. Thus, two dots are considered to have a value of 0, and the other two are considered to have a value of 255.

The scaled value corresponding to dot 141 is then calculated as a function of the scaled values of these neighboring dots. One way to do this is to take the average of the scaled values of the neighboring dots. In the described embodiment, however, a weighted average is used. Specifically, some form of interpolation (such as linear, bilinear, or bicubic interpolation) is used to calculate a scaled value corresponding to dot 141, based on the relative image position of dot 141 among neighboring dots 142–145. Thus, the values of nearer neighbors are given more weight than the values of more distant neighbors when calculating scaled value 141. In the example shown, the scaled value of dot 141 might be approximately 64, since it is nearer its white neighbors than its black neighbors.

Scaled values are calculated in this manner for each location in the converted array. Once this is done, diffusion (such as linear or error diffusion) is applied to the array to convert the scaled values to binary, on/off values appropriate for facsimile transmission. The converted array is then transmitted to the remote facsimile machine.

Figure 4:
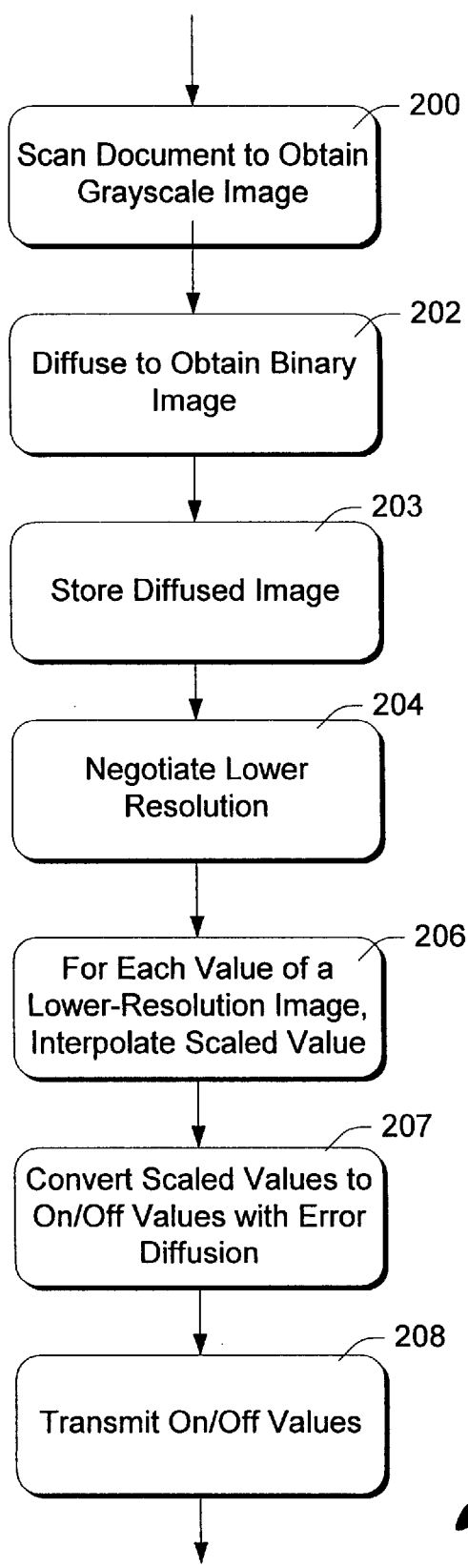
FIG. 4 is a flowchart illustrating methodological steps in accordance with the described embodiment of the invention.

FIG. 4 illustrates the invention in terms of its preferred methodological aspects. A step 200 comprises optically scanning a document to obtain a grayscale image of the document. Step 202 comprises diffusing the grayscale image to produce a first array of on/off image values corresponding to a first spatial resolution (in the example above, the first spatial resolution is 300×300 DPI). Step 203 comprises storing the diffused image as a black-and-white image in memory of the facsimile device.

Step 204 comprises negotiating with a remote facsimile device to transmit the image facsimile at a second spatial resolution that is lower than the first spatial resolution (in the example above, the second spatial resolution is 200×200 DPI). This results in a need to convert the stored image to a lower resolution.

Steps 206 and 207 comprise converting the first array of on/off image values to a second array of image values corresponding to the second spatial resolution. Step 206 comprises, for each individual image value of the second array, identifying a plurality of image values of the first array having image positions neighboring the image position of the individual image value, and calculating a scaled value as a function of the neighboring image values. This step preferably involves interpolating between the neighboring image values as a function of the relative image position of the individual image value among the neighboring image values.

Step 207 comprises diffusing the scaled values to produce corresponding on/off values of the second array.

Step 208 comprises transmitting the diffused second array to the remote facsimile device.

The steps described above yield much better results than prior art methods of converting diffused images to lower resolutions. Specifically, these steps reduce or eliminate the artifacts that result from prior art methods of conversion.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of sending an image facsimile, comprising the following steps:
    scanning an image to produce a first array of on/off image values corresponding to a first spatial resolution;
    converting the first array of on/off image values to a second array of image values corresponding to a second spatial resolution that is lower than the first spatial resolution;
    wherein the image values of the first and second arrays correspond respectively to known image positions;
    wherein the converting step comprises, for each individual image value of the second array:
        identifying a plurality of image values of the first array having image positions neighboring the image position of said individual image value;
        calculating a scaled value as a function of the neighboring image values;
        converting the scaled value to an on/off value.

2. A method as recited in claim 1, wherein the step of calculating the scaled value comprises interpolating between the neighboring image values as a function of the relative image position of said individual image value among said neighboring image values.

3. A method as recited in claim 1, comprising a further step of diffusing to produce the on/off image values of the first array.

4. A method as recited in claim 1, wherein the step of converting the scaled value to an on/off value comprises diffusing the scaled values resulting from the calculating step.

5. A method as recited in claim 1, wherein the first spatial resolution is 300 dots per inch and the second spatial resolution is 200 dots per inch.

6. A method as recited in claim 1, wherein:
    the step of calculating the scaled value comprises interpolating between the neighboring image values as a function of the relative image position of said individual image value among said neighboring image values;
    the step of converting the scaled value to an on/off value comprises diffusing the scaled values resulting from the calculating step.

7. A method as recited in claim 1, wherein the neighboring image values comprise those four image values that surrounding said individual image value.

8. A method of sending an image facsimile of a document, comprising the following steps:
    optically scanning the document to obtain a grayscale image of the document;
    diffusing the grayscale image to produce a first array of on/off image values corresponding to a first spatial resolution;
    negotiating with a remote facsimile device to transmit the image facsimile at a second spatial resolution that is lower than the first spatial resolution;
    converting the first array of on/off image values to a second array of image values corresponding to the second spatial resolution;
    wherein the image values of the first and second arrays correspond respectively to known image positions;
    wherein the converting step comprises:
        for each individual image value of the second array, identifying a plurality of image values of the first array having image positions neighboring the image position of said individual image value, and calculating a scaled value as a function of said neighboring image values;
        diffusing the scaled values to produce corresponding on/off values of the second array;
    transmitting the second array to the remote facsimile device.

9. A method as recited in claim 8, wherein the step of calculating the scaled value comprises interpolating between the neighboring image values as a function of the relative image position of said individual image value among said neighboring image values.

10. A method as recited in claim 8, wherein the first spatial resolution is 300 dots per inch and the second spatial resolution is 200 dots per inch.

11. A method as recited in claim 8, wherein the neighboring image values comprise those four image values that surrounding said individual image value.

12. A facsimile device, comprising:
    an optical scanner configured to obtain a grayscale image of a document;
    image processing logic configured to perform steps comprising:
        diffusing the grayscale image to produce a first array of on/off image values corresponding to a first spatial resolution;
        negotiating with a remote facsimile device to transmit the image facsimile at a second spatial resolution that is lower than the first spatial resolution;
        converting the first array of on/off image values to a second array of image values corresponding to the second spatial resolution;
        wherein the image values of the first and second arrays correspond respectively to known image positions;
        wherein the converting step comprises:
            for each individual image value of the second array, identifying a plurality of image values of the first array having image positions neighboring the image position of said individual image value, and calculating a scaled value as a function of said neighboring image values;
            diffusing the scaled values to produce corresponding on/off values of the second array.

13. A facsimile device as recited in claim 12, wherein the step of calculating the scaled value comprises interpolating between the neighboring image values as a function of the relative image position of said individual image value among said neighboring image values.

14. A facsimile device as recited in claim 12, wherein the first spatial resolution is 300 dots per inch and the second spatial resolution is 200 dots per inch.

15. A facsimile device as recited in claim 12, wherein the neighboring image values comprise those four image values that surrounding said individual image value.

* * * * *